(12) United States Patent
Azuma et al.

(10) Patent No.: US 11,390,325 B2
(45) Date of Patent: Jul. 19, 2022

(54) WORK VEHICLE

(71) Applicant: Kubota Corporation, Osaka (JP)

(72) Inventors: Masahiro Azuma, Sakai (JP); Tatsuya Nagatomi, Sakai (JP)

(73) Assignee: Kubota Corporation, Osaka (JP)

( * ) Notice: Subject to any disclaimer, the term of this patent is extended or adjusted under 35 U.S.C. 154(b) by 22 days.

(21) Appl. No.: 16/882,913

(22) Filed: May 26, 2020

(65) Prior Publication Data

US 2021/0086834 A1 Mar. 25, 2021

(30) Foreign Application Priority Data

Sep. 20, 2019 (JP) .............................. JP2019-171941

(51) Int. Cl.
*B62D 21/11* (2006.01)
*B60G 9/00* (2006.01)
*B60G 15/06* (2006.01)

(52) U.S. Cl.
CPC ............... *B62D 21/11* (2013.01); *B60G 9/00* (2013.01); *B60G 15/062* (2013.01); *B60G 15/067* (2013.01)

(58) Field of Classification Search
CPC ............... B60G 9/00; B60G 2300/024; B60G 2300/07; B60G 2300/124; B60G 15/067; B60G 2200/314; B60G 2200/341; B62D 21/055; B62D 21/0553; B62D 21/11
See application file for complete search history.

(56) References Cited

U.S. PATENT DOCUMENTS

| | | | | |
|---|---|---|---|---|
| 4,087,116 A | * | 5/1978 | Morimoto ................ | B60G 9/00 280/124.104 |
| 6,357,768 B1 | * | 3/2002 | Chan ...................... | B60G 9/006 280/124.106 |
| 7,600,769 B2 | * | 10/2009 | Bessho .................. | B60G 9/022 280/124.109 |
| 2006/0017256 A1 | * | 1/2006 | Hupperich, Jr. ......... | B60G 9/00 280/124.156 |
| 2009/0066052 A1 | | 3/2009 | Bessho et al. | |

FOREIGN PATENT DOCUMENTS

| | | | | |
|---|---|---|---|---|
| DE | 60009097 T2 | * | 1/2005 | ............. B60G 7/008 |
| EP | 0499887 A1 | * | 8/1992 | ............. B60G 9/027 |
| JP | H05319049 A | * | 12/1993 | |
| JP | 200967082 A | | 4/2009 | |
| WO | WO-9500348 A1 | * | 1/1995 | ................ F16F 5/00 |
| WO | WO-2011148097 A1 | * | 12/2011 | ............. B60G 9/025 |

* cited by examiner

*Primary Examiner* — Jonathan Ng
*Assistant Examiner* — Mary E Young
(74) *Attorney, Agent, or Firm* — The Webb Law Firm

(57) ABSTRACT

A work vehicle according to the present invention includes left and right axle cases of a rigid axle type, and left and right suspension mechanisms movable in the up-down direction relative to body frames and separately supporting the left and right axle cases, respectively. The work vehicle also includes (i) a first projection projecting downward from the left or right one of the body frames, (ii) a second projection projecting upward from that position on either the left and right axle cases or a frame body integrated with the axle cases which is opposite to the first projection in the left-right direction, and (iii) a lateral rod having a first end connected with the first projection and a second end connected with the second projection.

7 Claims, 5 Drawing Sheets

WORK VEHICLE

CROSS REFERENCE TO RELATED APPLICATION

This application claims priority to Japanese Patent Application No. 2019-171941 filed Sep. 20, 2019, the disclosure of which is hereby incorporated by reference in its entirety.

TECHNICAL FIELD

The present invention relates to a work vehicle including left and right axle cases of a rigid axle type, the left and right axle cases coaxially supporting left and right axles for driving left and right wheels, respectively.

BACKGROUND ART

An example work vehicle configured as above is disclosed in JP 2009-67082 A. JP 2009-67082 A describes a rigid axle suspension for suspending left and right wheels, the rigid axle suspension including (i) a pair of left and right arms for positioning the left and right wheels in the front-rear direction, (ii) a pair of left and right coil springs and a pair of left and right dampers for absorbing shock from a road surface, and (iii) a lateral rod for positioning the left and right wheels in the left-right direction.

The work vehicle disclosed in JP 2009-67082 A further includes (i) a body frame having a rear end portion supporting a pair of left and right arms at an upper position and a pair of left and right arms at a lower position in such a manner that each pair of left and right arms are swingable on the core of a lateral shaft, (ii) an auxiliary frame connected with the pair of left and right arms, the auxiliary frame supporting left and right rear axle cases, and (iii) coil springs and dampers connected with each other in such a manner as to reduce up-down movement of the auxiliary frame. The lateral rod is, in particular, oriented laterally by (i) connecting a first end thereof with the body frame ("base frame" in the patent literature) and (ii) connecting a second end thereof with the auxiliary frame.

SUMMARY OF INVENTION

Technical Problem

The work vehicle disclosed in JP 2009-67082 A is configured such that the lateral rod has a first end connected with a bracket provided for the body frame and a second end connected with a bracket provided for the auxiliary frame.

A lateral rod receives a strong lateral force for positioning left and right wheels in the lateral direction relative to the body frame. The brackets disclosed in JP 2009-67082 A each need to have a great strength.

While an off-road multipurpose work vehicle is running, its wheels often become moved up and down greatly. Even for a work vehicle including coils and dampers as disclosed in JP 2009-67082 A, the wheels can reach their mechanical limits if lifted suddenly and greatly.

A work vehicle including wheels that can reach their mechanical limits if lifted suddenly and greatly as described above will unfortunately let the driver feel the shock, and thus has room for improvement. Further, the use of brackets, for example, for supporting a lateral rod involves an increase in the number of parts used and structural complexity.

This has led to a demand for a work vehicle that allows a lateral rod to be supported without an increase in the number of parts used and that regulates lateral displacement of left and right wheels.

Solution to Problem

A work vehicle according to the present invention comprises: a left wheel provided for a vehicle body; a right wheel provided for the vehicle body; a body frame provided for the vehicle body; a left axle connected with the left wheel; a right axle connected with the right wheel; a left axle case and a right axle case, the left and right axle cases being of a rigid axle type and supporting the left and right axles so that the left and right axles are coaxial with respect to each other; a left suspension mechanism via which the body frame supports the left axle case; a right suspension mechanism via which the body frame supports the right axle case; a first projection projecting downward from a left or right portion of the body frame; a second projection projecting upward from that position on either (i) the left and right axle cases or (ii) a frame body integrated with the left and right axle cases which is opposite to the first projection in a left-right direction; and a lateral rod having a first end connected with the first projection and a second end connected with the second projection.

With the above configuration, the lateral rod has (i) a first end connected with a first projection projecting downward from the body frame and (ii) a second end connected with a second projection projecting upward from that position on either the axle cases or the frame body which is opposite to the first projection in the left-right direction. The above configuration thus allows a lateral rod to be provided without use of brackets. The first projection is present on the body frame, whereas the second projection is present on either an axle case or the frame body. Placing a lateral rod between the first and second projections allows the body frame and left and right wheels to be positioned in the left-right direction.

In particular, if the work vehicle has received an external force that acts in such a manner as to laterally displace the axle cases, the second projection on an axle case allows the force to be transmitted from the lateral rod directly to the axle cases, thereby achieving a strong regulation.

With the above configuration, the work vehicle allows a lateral rod to be supported without an increase in the number of parts used and regulates lateral displacement of left and right wheels.

The work vehicle may further comprise a first opposing portion at that portion of either the left and right axle cases or the frame body which is located below the first projection; a first buffer member on either a lower surface of the first projection or the first opposing portion; a second opposing portion at that portion of the body frame which is located above the second projection; and a second buffer member on either an upper surface of the second projection or the second opposing portion.

With the above configuration, if the wheels have become lifted greatly, the first buffer member (which is present between the first projection and the first opposing portion) and the second buffer member (which is present between the second projection and the second opposing portion) prevent the wheels from disadvantageously reaching their mechanical limits and absorb the shock at the same time. Further, the first projection and the second projection, each of which has a great strength, rigidly support the lateral rod and thereby strongly regulate lateral displacement of left and right wheels.

With the above configuration, the first projection and the second projection overlap with the axle cases in a plan view. Thus, if the wheels have become lifted greatly, the force caused by the axle cases being lifted can be received by the buffer members located at such positions that the force is linearly applied to the buffer members, thereby allowing the force to be reliably received with a great strength.

The work vehicle may further be configured such that the first opposing portion is an upper surface of the frame body; the first buffer member is present on the lower surface of the first projection; the second opposing portion is a lower surface of a bar-shaped member projecting downward from the body frame; and the second buffer member is present on the second opposing portion.

With the above configuration, if the wheels have become lifted greatly, the first buffer member on the lower surface of the first projection comes into contact with the upper surface of the frame body, while the second buffer member on the lower surface of the bar-shaped member comes into contact with the upper surface of the second projection.

The above configuration allows the first buffer member and the second buffer member to be separated from the ground in the upward direction. The above configuration thus prevents muddy water and dust from adhering to and thereby degrading the first buffer member and the second buffer member in the case where the first buffer member and the second buffer member are each made of a rubber, for example.

The work vehicle may further be configured such that the first buffer member and the second buffer member are present at respective heights that are asymmetrical to each other in the left-right direction with respect to a center of the vehicle body as viewed in a front-rear direction.

For instance, with the lower end of the first projection being lower in position than the upper end of the second projection, while the first buffer member and the second buffer member are present at respective heights that are asymmetrical to each other with respect to the center of the vehicle body, the lateral rod can be oriented substantially horizontally as viewed in the front-rear direction. Orienting the lateral rod horizontally as such allows the lateral rod to receive force in a compressing direction and a tensile direction along its longitudinal direction. If an external force is applied that acts in such a manner as to laterally displace the left and right rear wheels, the lateral rod regulates the displacement strongly.

The work vehicle may further be configured such that the left and right wheels are rear wheels provided at a rear portion of the vehicle body.

With the above configuration, the lateral rod allows the body frame and the left and right rear wheels to be positioned in the left-right direction even for a work vehicle in which the respective axles of the rear wheels are supported respectively by the left and right axle cases of a rigid axle type.

DESCRIPTION OF EMBODIMENTS

The description below deals with an embodiment of the present invention with reference to drawings.

Overall Configuration

Figure 1:
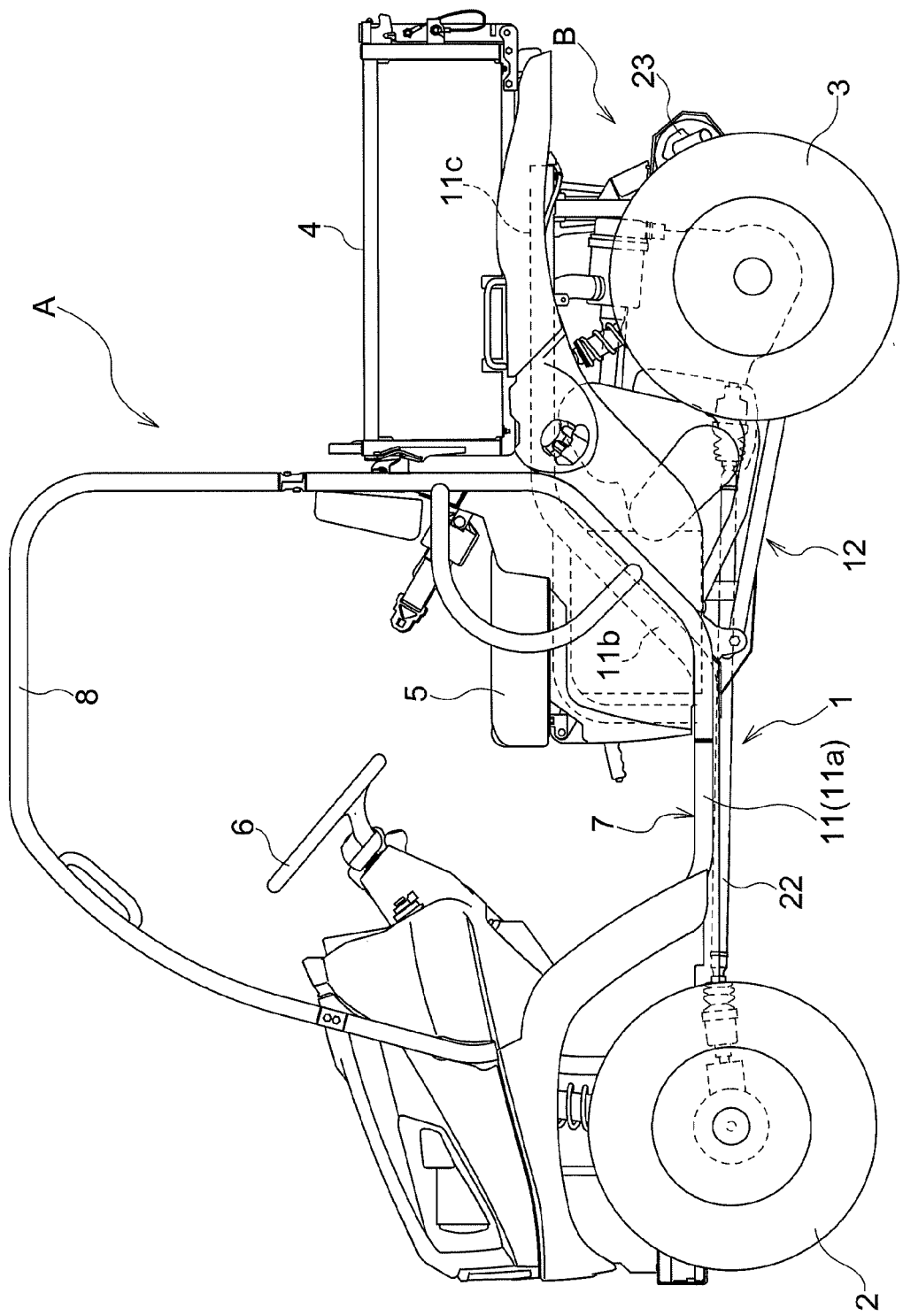
FIG. 1 is a side view of a work vehicle.

FIG. 1 illustrates a work vehicle including (i) a vehicle body 1, (ii) a pair of left and right front wheels 2 provided at a front portion of the vehicle body 1, (iii) a pair of left and right rear wheels 3 at a rear portion of the vehicle body 1, (iv) a driving part A at a central portion of the vehicle body 1, (v) a truck box 4 at a rear portion of the vehicle body 1, and (vi) a motor part B under the truck box 4.

The work vehicle is a four-wheel drive vehicle (in which the motor part B transmits a driving force to both the front wheels 2 and the rear wheels 3). The work vehicle is a utility vehicle designed to be used for multiple purposes such as farmwork and transportation. The truck box 4 is configured such that a front portion thereof can be lifted for a slanted position in response to an operation of a dump cylinder (not shown in the drawings) to allow a load to be dumped rearward by its self weight.

The driving part A includes (i) a driver's seat 5 for a driver to sit on, (ii) a steering wheel 6 provided in front of the driver's seat 5 to allow the driver to steer the front wheels 2, and (iii) a floor 7 at a lower portion.

The driving part A also includes ROPS frames 8 at left and right positions to protect the driver and any occupant in the event of a roll-over accident of the work vehicle. The driving part A also includes an occupant's seat (not shown in the drawings) provided at a left or right portion of the vehicle body and adjacent laterally to the driver's seat 5.

[Vehicle Body]

Figure 2:
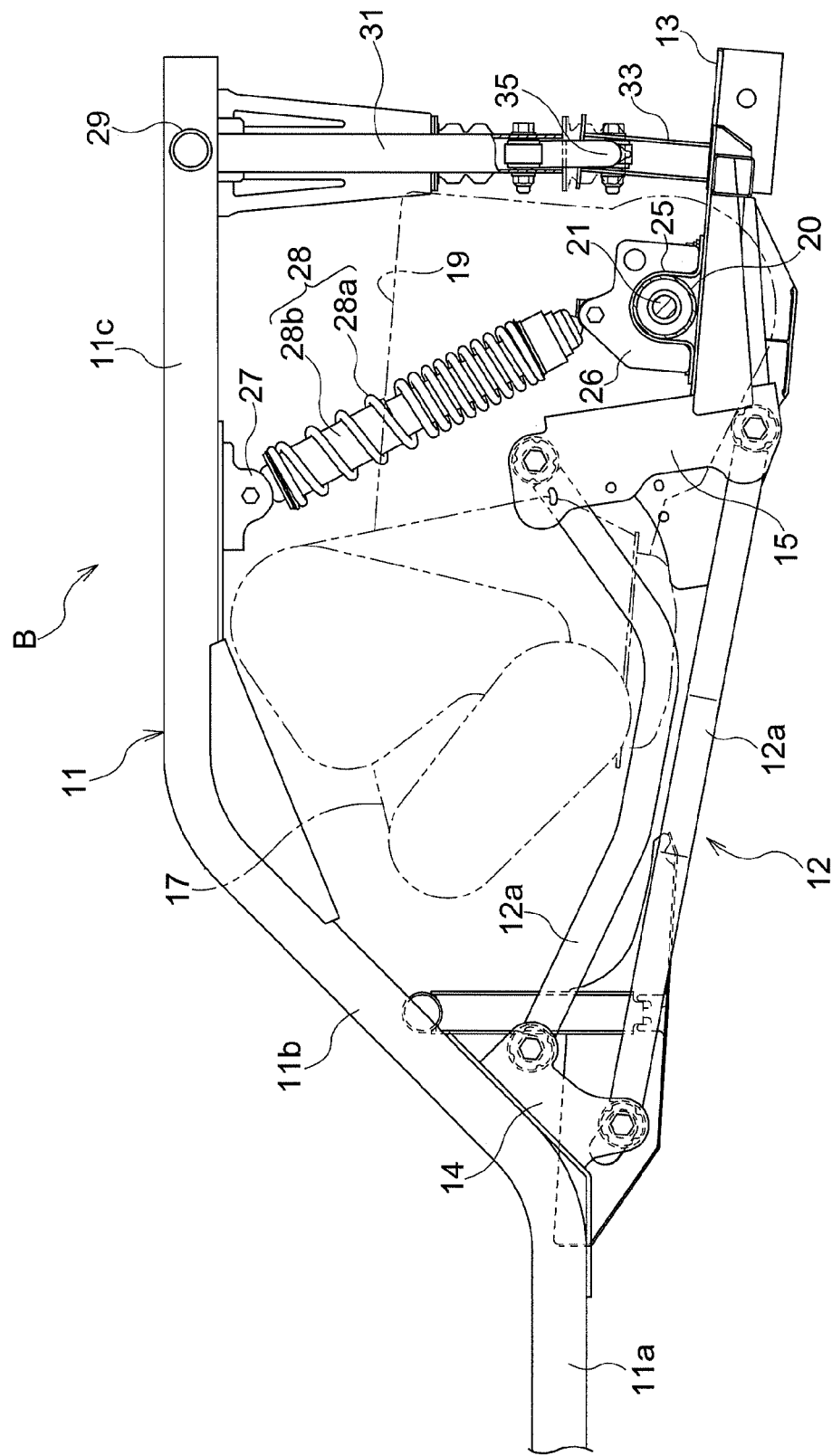
FIG. 2 is a side view of a motor part and a structure for suspending rear wheels.
Figure 3:
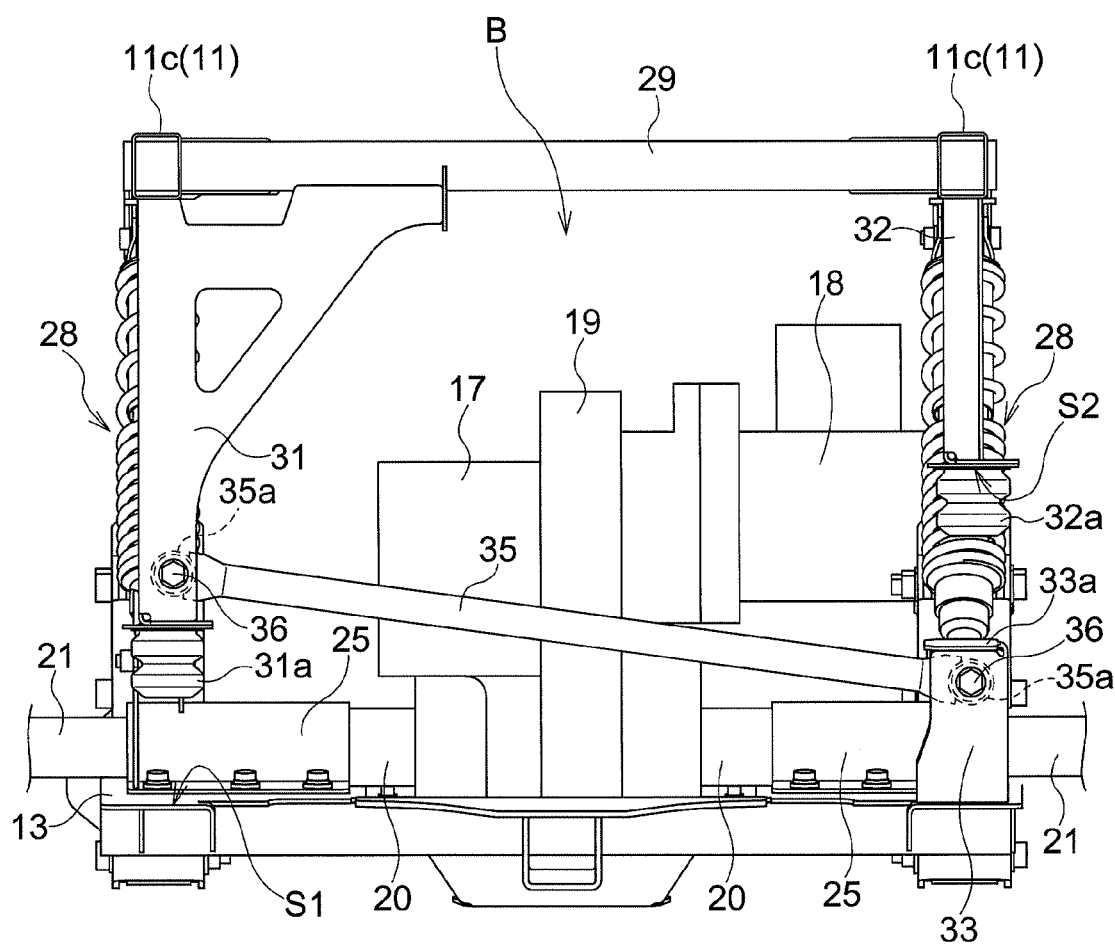
FIG. 3 is a rear view, illustrating how a lateral rod is placed.

As illustrated in FIGS. 1 to 3, the vehicle body 1 includes (i) a pair of left and right body frames 11 each in a region extending from a position at a front portion of the driving part A through a space under the floor 7 to the motor part B and (ii) left and right link frames 12 provided for the motor part B in such a manner as to be vertically displaceable relative to the body frames 11.

The left and right body frames 11 each include a square pipe member. The body frames 11 each include (i) a front frame 11a extending in the front-rear direction below the floor 7, (ii) an intermediate frame 11b extending obliquely rearward and upward from a position at a rear portion of the front frame 11a, and (iii) a rear frame 11c extending rearward from a position at a rear portion of the intermediate frame 11b to be oriented horizontally under the truck box 4.

Figure 4:
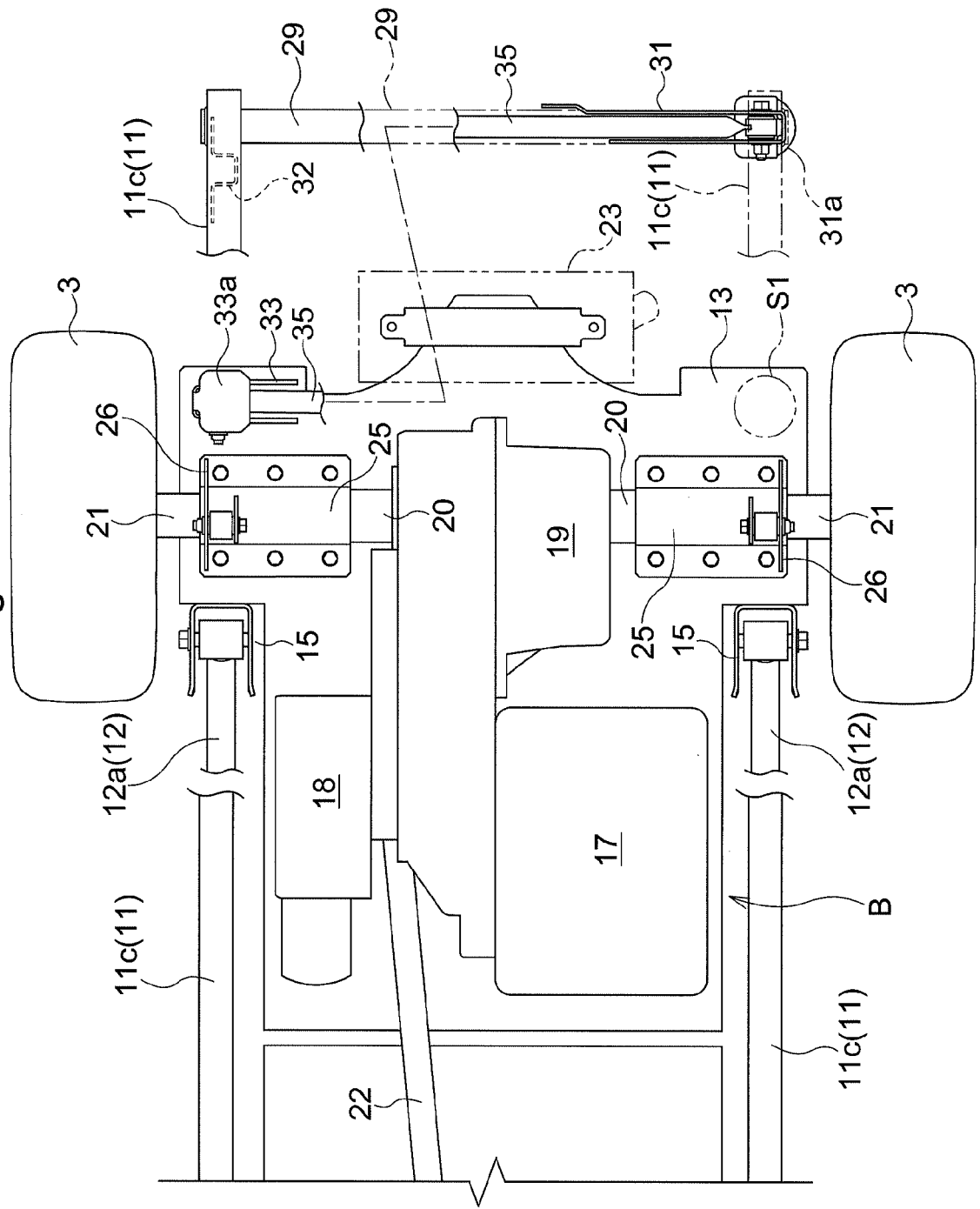
FIG. 4 is a schematic plan view of a motor part and a structure for suspending rear wheels.

As illustrated in FIGS. 2 and 4, the work vehicle includes a unit frame 13 (which is an example frame body) below the rear frames 11c. The unit frame 13 is in the shape of a plate with a width slightly smaller than the left-right distance between the left and right rear frames 11c. As illustrated in FIG. 2, the left and right link frames 12 each include a pair of upper and lower link members 12a each in the form of a round pipe member. The left and right intermediate frames 11b have respective lower portions to which a front bracket 14 is fixed. The unit frame 13 has left and right portions to which a rear bracket 15 is fixed.

The pair of upper and lower link members 12a each have (i) a front end linked swingably to the front bracket 14 by a lateral shaft and (ii) a rear end linked swingably to the rear bracket 15 by a lateral shaft. With this configuration, an external force applied to the unit frame 13 causes the link frames 12 to swing and thereby causes the unit frame 13 to move up and down relative to the body frames 11. In particular, the left and right link frames 12 being swingable independently of each other allows the unit frame 13 to become slanted in the left-right direction as well.

[Motor Part/Suspension Structure]

As illustrated in FIGS. 2 to 4, the motor part B is a unitized whole that is made up of an engine 17, a continuously variable transmission device 18, and a transmission case 19 connected with one another and that is supported by the unit frame 13.

As illustrated in FIG. 4, the engine 17 is connected with a left side surface of a front end of the transmission case 19, whereas the continuously variable transmission device 18 is connected with a right side surface of the front end of the transmission case 19. The transmission case 19 has a rear end portion with which axle cases 20 are connected in such a manner as to project in the left-right direction. The axle cases 20 each contain a rear axle 21 extending therethrough. The rear axles 21 each have an outer end with which one of the rear wheels 3 is connected. Further, the motor part B includes a front-wheel drive shaft 22 extending forward from the transmission case 19 and configured to transmit a driving force to the front wheels 2.

As illustrated in FIG. 4, the unit frame 13 has a rear end provided with a muffler 23 configured to reduce the discharge noise of the engine 17. The transmission case 19 contains (i) a gear shift part configured to change the speed at which the rear wheels 3 are driven and (ii) a differential gear configured to transmit a driving force to the left and right rear axles 21. The motor part B includes brake units provided near the respective outer ends of the left and right rear axles 21 to each apply a braking force to the corresponding one of the rear wheels 3.

The above configuration allows a driving force of the engine 17 to be (i) transmitted to the transmission case 19 while being varied non-stepwise by the continuously variable transmission device 18 and then (ii) transmitted from the transmission case 19 to the left and right rear wheels 3 and the left and right front wheels 2. This in turn allows the work vehicle to travel at a desired speed.

The work vehicle is configured such that the left and right rear axles 21 are coaxial with respect to each other and that the left and right axle cases 20 are of the rigid axle type to maintain the coaxial relationship. As illustrated in FIGS. 2 and 4, the left and right axle cases 20 are each fixed to the upper surface of the unit frame 13 with use of a holder 25, so that the axle cases 20 and the unit frame 13 are integrated with each other. The left and right holders 25 are each provided with an axle-side support 26. The rear frames 11*c* each have a lower surface provided with a frame-side support 27. The motor part B includes a suspension mechanism 28 between the axle-side support 26 and the frame-side support 27. The suspension mechanisms 28 each include a suspension spring 28*a* and a damper 28*b*. The left and right suspension mechanisms 28 each separately support the corresponding one of the left and right axle cases 20.

With the left and right rear wheels 3 suspended with use of the left and right link frames 12 and the left and right suspension mechanisms 28 as described above, the following advantage is achieved: Suppose that when the work vehicle is running, one of the left and right rear wheels 3 has been lifted greatly as in the case where, for instance, one of the rear wheels 3 moves over a clod. In such cases, (i) the corresponding one of the suspension mechanisms 28 is compressed greatly, and (ii) the left and right link frames 12 are swung independently of each other, causing the unit frame 13 to be slanted in such a manner as to maintain the coaxial relationship between the left and right rear axles 21.

As illustrated in FIGS. 2 to 5, the left and right rear frames 11*c* have respective rear ends connected with each other with use of a lateral reinforcing frame 29. The left rear frame 11*c* has a lower surface rearward of the corresponding axle case 20, the lower surface being provided with a left support 31 (which is an example first projection) projecting downward. The left support 31 has a lower surface provided with a first buffer member 31*a* made of a rubber. Further, the unit frame 13 has a left opposing portion S1 (which is an example first opposing portion) immediately below the first buffer member 31*a*. The first buffer member 31*a* has a lower surface separated from the left opposing portion S1 by a gap.

The right rear frame 11*c* has a lower surface rearward of the corresponding axle case 20, the lower surface being provided with a right support 32 (which is an example bar-shaped member) projecting downward. The right support 32 has a lower surface provided with a right opposing portion S2 (which is an example second opposing portion). The right opposing portion S2 is provided with a second buffer member 32*a* made of a rubber.

The unit frame 13 has an upper surface immediately below the right support 32, the upper surface being provided with a regulating body 33 (which is an example second projection) standing thereon. The regulating body 33 has an upper surface provided with a flat regulating wall 33*a*. The second buffer member 32*a* has a lower surface separated from the regulating wall 33*a* (which is on the upper surface of the regulating body 33) by a gap.

As illustrated in FIG. 3, the right support 32 projects downward by a length smaller than the length by which the left support 31 projects downward. This structure results in the first buffer member 31*a* and the second buffer member 32*a* being present at respective heights that are asymmetrical to each other in the left-right direction with respect to the center of the vehicle body 1 as viewed in the front-rear direction. The above structure also allows the first buffer member 31*a* and the second buffer member 32*a* to be separated from the ground in the upward direction. This prevents muddy water and dust from adhering to and thereby degrading the first buffer member 31*a* and the second buffer member 32*a*.

As illustrated in FIG. 3, the lower surface of the first buffer member 31*a* is separated from the left opposing portion S1 by a distance equal to the distance by which the lower surface of the second buffer member 32*a* is separated from the regulating wall 33*a*. This allows the first buffer member 31*a* and the second buffer member 32*a* to be compressed simultaneously if the left and right rear wheels 3 have become lifted equally greatly. The first buffer member 31*a* and the second buffer member 32*a* may each be made of a flexibly deformable resin instead of a rubber. The first buffer member 31*a* and the second buffer member 32*a* may also each be combined with a compression spring.

Figure 5:
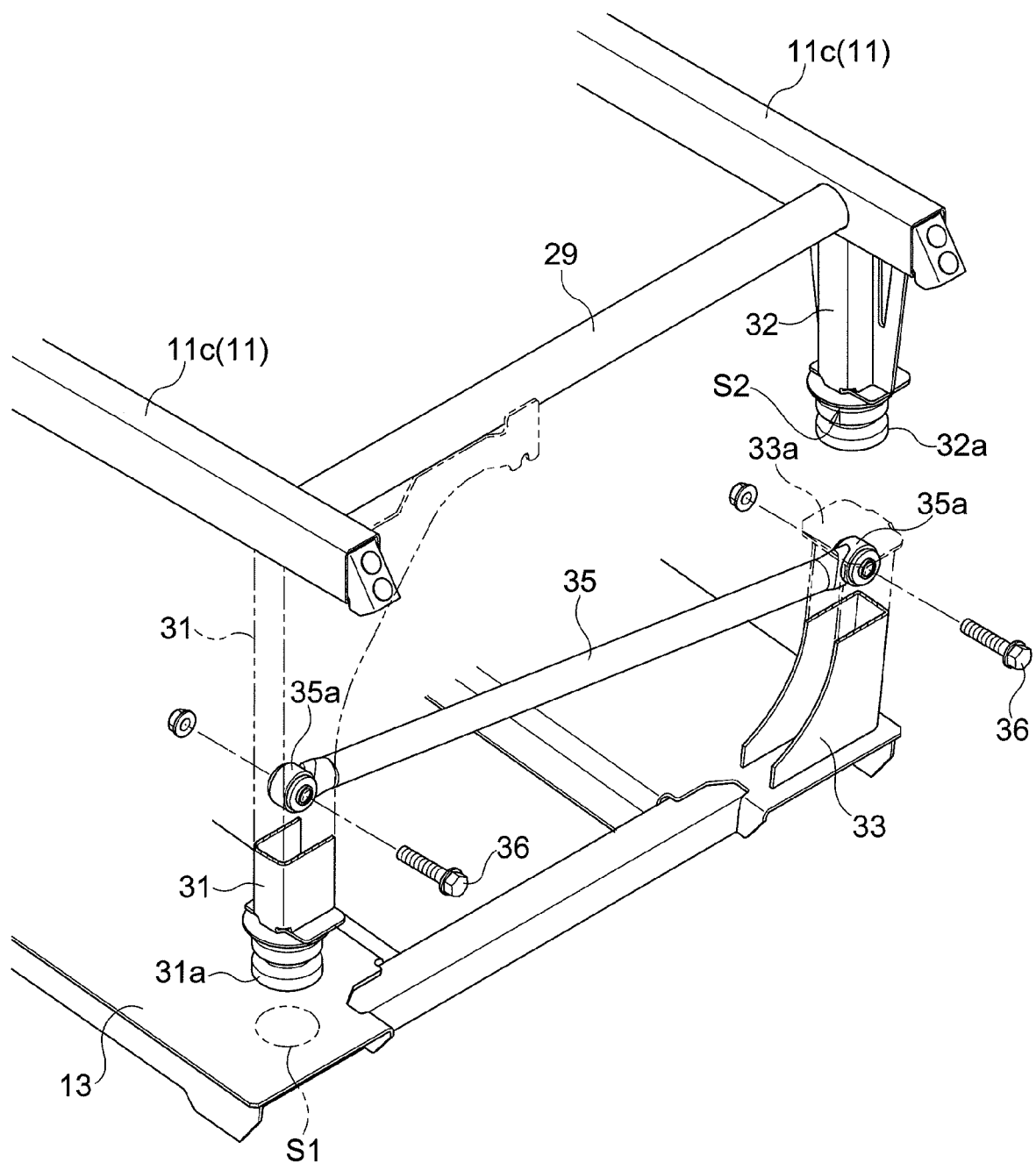
FIG. 5 is a perspective view, illustrating a structure for supporting a lateral rod.

As illustrated in FIG. 5, the left support 31 (which is an example first projection) is a plate member bent to have a U-shaped cross section and thereby have a front wall and a rear wall. The plate member has an upper end welded or otherwise fixed to the left rear frame 11*c* and the reinforcing frame 29. This allows the left support 31 to project downward from a bottom portion of the rear frame 11*c*.

The right support 32 (which is an example bar-shaped member) includes members such as a square pipe member and rib members. The right support 32 has an upper end welded or otherwise fixed to the lower surface of the right rear frame 11c. This allows the right support 32 to project downward. The regulating body 33 (which is an example second projection) is a plate member bent to have a U-shaped cross section and thereby have a front wall and a rear wall. The plate member has a lower end welded or otherwise fixed to the upper surface of the unit frame 13. This allows the regulating body 33 to project upward from the upper surface of the unit frame 13.

As illustrated in FIGS. 2 to 5, the work vehicle includes a lateral rod 35 between the left support 31 (which is an example first projection) and the regulating body 33 (which is an example second projection) for regulating displacement of the left and right rear wheels 3 in the left-right direction with respect to the body frames 11. While a lateral rod is also referred to as a panhard rod, the description of the present embodiment consistently uses the term "lateral rod" throughout.

The lateral rod 35 has opposite ends each having a ring-shaped holding part 35a. The lateral rod 35 is held in position by (i) placing one of the holding parts 35a between the front wall and the rear wall of the left support 31, (ii) placing the other holding part 35a between the front wall and the rear wall of the regulating body 33, and (iii) fastening each holding part 35a with a connecting bolt 36.

The left support 31 and the regulating body 33, which determine the limit on how much the rear wheels 3 can be lifted, double as members for supporting the lateral rod 35. This eliminates the need to additionally provide brackets for supporting the lateral rod 35. The above simple structure makes it possible to avoid an increase in the number of parts used and thereby avoid structural complexity, while allowing the lateral rod 35 to strongly regulate displacement of the left and right rear wheels 3 in the left-right direction.

The above suspension structure allows (i) the first buffer member 31a and the upper surface of the unit frame 13 to come into contact with each other and (ii) the lower surface of the second buffer member 32a and the upper surface of the regulating wall 33a of the regulating body 33 to come into contact with each other if the left and right rear wheels 3 have become lifted greatly at the same time. This prevents the left and right rear wheels 3 from disadvantageously reaching their mechanical limits, and also reduces the shock of the contact as a result of each buffer member being compressed.

As described above, the left and right axle cases 20 are of the rigid axle type. Thus, if one of the left and right rear wheels 3 has been lifted greatly, the corresponding buffer member comes into contact with its opposing surface to prevent the rear wheels 3 from disadvantageously being moved beyond their mechanical limits, and is also compressed to reduce the shock.

Other Embodiments

The present invention may alternatively be arranged as below other than the embodiment described above. Any member below that is identical in function to a particular member described for the above embodiment has the same reference sign as that particular member.

(a) The present invention is applicable to a work vehicle including (i) a vehicle body 1, (ii) left and right front wheels 2 at a front portion of the vehicle body 1, and (iii) left and right axle cases of a rigid axle type that correspond respectively to the left and right front wheels 2, the work vehicle further including a lateral rod 35 for regulating lateral displacement of the axle cases at the front portion of the vehicle body 1.

(b) The present invention is not limited to a work vehicle including (i) a vehicle body 1, (ii) left and right rear wheels 3 at a rear portion of the vehicle body 1, and (iii) axle cases 20 of a rigid axle type that correspond respectively to the left and right rear wheels 3 as described for the above embodiment. A work vehicle including (i) a vehicle body 1, (ii) left and right front wheels 2 at a front portion of the vehicle body 1, and (iii) left and right axle cases of a rigid axle type that correspond respectively to the left and right front wheels 2 as described for the other embodiment (a) may be configured such that the first projection overlaps with and lies over an axle case in a plan view so that the axle case has an upper surface that serves as the first opposing portion.

(c) The present invention is not limited to a work vehicle including (i) a vehicle body 1, (ii) left and right rear wheels 3 at a rear portion of the vehicle body 1, and (iii) axle cases 20 of a rigid axle type that correspond respectively to the left and right rear wheels 3 as described for the above embodiment. A work vehicle including (i) a vehicle body 1, (ii) left and right front wheels 2 at a front portion of the vehicle body 1, and (iii) left and right axle cases of a rigid axle type that correspond respectively to the left and right front wheels 2 as described for the other embodiment (a) may include a second projection projecting upward from the upper surface of an axle case.

The other embodiment (c) may include a bar-shaped member projecting downward from a position on that portion of the body frames 11 which is at the front portion of the vehicle body 1, the position being above the second projection. With this configuration, the bar-shaped member has a lower surface that serves as the second opposing portion.

The other embodiments (b) and (c) are configured such that if the left and right axle cases have become lifted greatly, the first projection and the second projection, each of which overlaps with an axle case in a plan view, receives a force caused by the axle cases being lifted. This configuration provides a great strength and saves space. The embodiment described above, which is configured such that a force caused by the axle cases being lifted is received by the unit frame 13 (frame body), regulates the lifting of the axle cases 20 with use of the unit frame 13. The embodiment described above thus involves a unit frame 13 that has a great strength.

In view of the other embodiments (b) and (c), the other embodiment (a) can be described in detail as including (i) a first projection projecting downward from the left or right one of the body frames 11 (which are at a front portion of the vehicle body 1) toward the upper surface of the left or right axle case, (ii) a second projection projecting upward from that position on the left or right axle case which is opposite to the first projection in the left-right direction, and (iii) a lateral rod 35 having a first end connected with the first projection and a second end connected with the second projection.

With the above configuration, the lateral rod 35, which is present between the second projection (which is on one of the axle cases corresponding respectively to the left and right front wheels 2) and one of the body frames 11, allows the left and right front wheels to be strongly positioned in the lateral direction. The other embodiment (a) may further include (i) a buffer member on the lower surface of the first projection and (ii) another buffer member on the lower surface of the bar-shaped member (which is present immediately above the second projection). For instance, if the left and right front wheels 2 have become lifted greatly at the same time, (i) the buffer member on the lower surface of the first projection comes into contact with the upper surface of the corresponding axle case, while (ii) the buffer member on the lower surface of the bar-shaped member comes into contact with the upper surface of the second projection, thereby limiting the lift of the axle cases.

The first projection and the second projection ideally overlap with the axle cases in a plan view as in the other embodiments (b) and (c). However, the ideal arrangement is often difficult to achieve in view of how various devices for the vehicle body 1 are arranged. The left support 31 (which is an example first projection) and the regulating body 33 (which is an example second projection) may be present, for instance, rearward of the axle cases 20 as described for the embodiment described above. The left support 31 (which is an example first projection) and the regulating body 33 (which is an example second projection) may alternatively be present forward of the axle cases 20.

The above arrangement is applicable to both the respective axle cases of the front wheels 2 and the respective axle cases of the rear wheels 3. Whichever the arrangement is applied to, the first projection and the second projection are each desirably present close to the corresponding axle case in a plan view. Such an arrangement allows for a relatively free layout of members including the first projection and the second projection.

(d) The embodiment described above may alternatively be configured as an example such that (i) the first buffer member 31*a* may be present not on the lower surface of the left support 31 (which is an example first projection) but on that portion of the upper surface of the unit frame 13 which is located immediately below the left support 31 (that is, at the position of the left opposing portion S1 illustrated in FIG. 5) and/or that (ii) the second buffer member 32*a* may be present not on the lower surface of the right support 32 (which is an example bar-shaped member) but on that portion of the upper surface of the regulating body 33 (which is an example second projection) which is located immediately below the right support 32.

The configuration of the other embodiment (d) is applicable also to a work vehicle including (i) a vehicle body 1, (ii) left and right front wheels 2 at a front portion of the vehicle body 1, and (iii) left and right axle cases of a rigid axle type that correspond respectively to the left and right front wheels 2. If even one of the left and right wheels has become lifted greatly, the buffer members each perform its buffer function and prevent the left and right wheels from disadvantageously reaching their mechanical limits, similarly to the embodiment described above.

(e) The embodiment described above may alternatively be configured as an example such that the right support 32 (which is an example bar-shaped member) is absent and that the regulating body 33 (which is an example second projection) has an extended length in the up-down direction and has an upper surface on which the second buffer member 32*a* is present. With this configuration of the other embodiment (e), if the rear wheels 3 have become lifted greatly, the second buffer member 32*a* on the upper surface of the regulating body 33 comes into direct contact with the lower surface of the corresponding rear frame 11*c*. This prevents the rear wheels 3 from disadvantageously reaching their mechanical limits.

The other embodiment (e) may alternatively be configured as a variation such that the right support 32 is absent, that the regulating body 33 has an extended length in the up-down direction, and that the second buffer member 32*a* is present on the lower surface of the corresponding rear frame 11*c*. The configuration of the other embodiment (e) is applicable also to a work vehicle including (i) a vehicle body 1, (ii) left and right front wheels 2 at a front portion of the vehicle body 1, and (iii) left and right axle cases of a rigid axle type that correspond respectively to the left and right front wheels 2.

(f) The embodiment described above may alternatively be configured as an example such that the first projection (which corresponds to the left support 31 for the embodiment described above) and the second projection (which corresponds to the regulating body 33 for the embodiment described above) may be switched around in position in the left-right direction. With this configuration, the lateral rod 35 is oriented at such a position as to connect (i) the second projection at a left portion of the vehicle body 1 with (ii) the first projection at a right portion of the vehicle body 1.

(g) The embodiment described above may alternatively be configured as an example such that the lower end of the left support 31 (which is an example first projection) may be lower in position than the upper end of the regulating body 33 (which is an example second projection) with the lateral rod 35 oriented horizontally between the left support 31 and the regulating body 33.

With the above configuration of the other embodiment (g), not only the first buffer member 31*a* and the second buffer member 32*a* are present at respective heights that are asymmetrical to each other with respect to the center of the vehicle body 1, but also the lateral rod 35 is oriented horizontally. This allows the lateral rod 35 to receive a strong force in both a compressing direction and a tensile direction.

(h) The left and right axle cases are each made of, for example, a cast metal to be integrated with each other, and a transmission case for transmitting a driving force to the left and right axle cases is separated from the axle cases. With this configuration, the frame body (which corresponds to the unit frame 13 for the embodiment described above) may be in the form of a bar oriented in the lateral direction of the vehicle body 1.

With the above configuration of the other embodiment (h), the first projection is present on a body frame 11, the second projection is present on a frame body in the form of a bar, and the lateral rod 35 is oriented at such a position as to connect the first projection with the second projection.

INDUSTRIAL APPLICABILITY

The present invention is applicable to a work vehicle including left and right axle cases of a rigid axle type, the left and right axle cases coaxially supporting left and right axles for driving left and right wheels, respectively.

REFERENCE SIGNS LIST

1 Vehicle body
2 Front wheel (wheel)
3 Rear wheel (wheel)
11 Body frame
13 Unit frame (frame body)
20 Axle case
21 Rear axle (axle)
28 Suspension mechanism
31 Left support (first projection)
31*a* First buffer member
32 Right support (bar-shaped member)
32*a* Second buffer member 33 Regulating body (second projection)
35 Lateral rod
S1 Left opposing portion (first opposing portion)
S2 Right opposing portion (second opposing portion)

The invention claimed is:

1. A work vehicle, comprising:
a left wheel provided for a vehicle body;
a right wheel provided for the vehicle body;
a body frame provided for the vehicle body;
a left axle connected with the left wheel;
a right axle connected with the right wheel;
a left axle case and a right axle case, the left and right axle cases being of a rigid axle type and supporting the left and right axles so that the left and right axles are coaxial with respect to each other;
a left suspension mechanism via which the body frame supports the left axle case;
a right suspension mechanism via which the body frame supports the right axle case;
a first projection projecting downward from a left or right portion of the body frame;
a second projection projecting upward from that position on either (i) the left and right axle cases or (ii) a frame body integrated with the left and right axle cases which is opposite to the first projection in a left-right direction;
a lateral rod having a first end connected with the first projection and a second end connected with the second projection;
a first opposing portion at that portion of either the left and right axle cases or the frame body which is located below the first projection; and
a first buffer member on either a lower surface of the first projection or the first opposing portion.

2. The work vehicle according to claim 1, further comprising:
a second opposing portion at that portion of the body frame which is located above the second projection; and
a second buffer member on either an upper surface of the second projection or the second opposing portion.

3. The work vehicle according to claim 2, wherein
the first opposing portion is an upper surface of the frame body; and
the first buffer member is present on the lower surface of the first projection;
the second opposing portion is a lower surface of a bar-shaped member projecting downward from the body frame; and
the second buffer member is present on the second opposing portion.

4. The work vehicle according to claim 2, wherein
the first buffer member and the second buffer member are present at respective heights that are asymmetrical to each other in the left-right direction with respect to a center of the vehicle body as viewed in a front-rear direction.

5. The work vehicle according to claim 1, wherein
the left and right wheels are rear wheels provided at a rear portion of the vehicle body.

6. A work vehicle, comprising:
a left wheel provided for a vehicle body;
a right wheel provided for the vehicle body;
a body frame provided for the vehicle body;
a left axle connected with the left wheel;
a right axle connected with the right wheel;
a left axle case and a right axle case, the left and right axle cases being of a rigid axle type and supporting the left and right axles so that the left and right axles are coaxial with respect to each other;
a left suspension mechanism via which the body frame supports the left axle case;
a right suspension mechanism via which the body frame supports the right axle case;
a first projection projecting downward from a left or right portion of the body frame;
a second projection projecting upward from that position on either (i) the left and right axle cases or (ii) a frame body integrated with the left and right axle cases which is opposite to the first projection in a left-right direction;
a lateral rod having a first end connected with the first projection and a second end connected with the second projection;
a second opposing portion at that portion of the body frame which is located above the second projection; and
a second buffer member on either an upper surface of the second projection or the second opposing portion.

7. The work vehicle according to claim 6, wherein
the left and right wheels are rear wheels provided at a rear portion of the vehicle body.

* * * * *